United States Patent
Golladay

(10) Patent No.: US 6,723,173 B1
(45) Date of Patent: Apr. 20, 2004

(54) TRUCK BODY FOR COMBINED TRANSPORT AND MAINTENANCE OF PORTABLE TOILETS

(76) Inventor: Ralph Golladay, 93 View Dr., Stuarts Draft, VA (US) 24477

( * ) Notice: Subject to any disclaimer, the term of this patent is extended or adjusted under 35 U.S.C. 154(b) by 175 days.

(21) Appl. No.: 10/016,093

(22) Filed: Dec. 7, 2001

Related U.S. Application Data

(60) Provisional application No. 60/251,762, filed on Dec. 7, 2000.

(51) Int. Cl.[7] .............................. B08B 5/04; B60R 15/04
(52) U.S. Cl. .............................. 134/21; 4/321; 280/831
(58) Field of Search .......................... 134/21, 42; 4/321, 4/323, 334, 458, 114.1; 280/831

(56) References Cited

U.S. PATENT DOCUMENTS

| | | | |
|---|---|---|---|
| 3,528,462 A | * | 9/1970 | quase .......................... 141/284 |
| 4,525,277 A | * | 6/1985 | Poulin .......................... 210/601 |
| 5,183,293 A | * | 2/1993 | Julian .......................... 280/430 |
| 5,548,456 A | * | 8/1996 | Jin .............................. 360/85 |
| 5,873,944 A | * | 2/1999 | Lien et al. ..................... 134/10 |
| 6,598,242 B1 | * | 7/2003 | Denome ........................ 4/321 |

* cited by examiner

*Primary Examiner*—Randy Gulakowski
*Assistant Examiner*—Saeed Chaudhry
(74) *Attorney, Agent, or Firm*—Kimberly O. Snead; Parker & De Stefano, PC

(57) ABSTRACT

A payload transporter, including a truck frame, a body having at least one waste storage tank storage tank, and a vacuum system, wherein the vacuum system is used to remove waste material from a portable toilet, wherein the waste material is stored in the waste storage tank, and wherein the payload transporter transports both the waste and the portable toilet to a preferred location. Special baffles are placed within the compartments to prevent liquid surge during transport and to provide structural support for both the top of the bed when transporting toilets and while the bed is under vacuum. Optionally, fresh water tanks can be included in the payload transporter and used to clean and replenish the portable toilets.

26 Claims, 6 Drawing Sheets

TRUCK BODY FOR COMBINED TRANSPORT AND MAINTENANCE OF PORTABLE TOILETS

This application claims the benefit of provisional Ser. No. 60/251,762, filed Dec. 7, 2000.

FIELD OF THE INVENTION

The invention described herein is a truck body for the combined transport and maintenance of portable chemical toilets. The top surface of the body is similar to that of any other flatbed body for the ease of transporting portable chemical toilets. The bottom surface of the body is boat-shaped and contains compartments for storage of waste removed from portable toilets by applying vacuum to the body. The boat-shaped bottom aids in dumping the waste. Special baffles are provided within the compartments to prevent liquid surge with vehicle motion and to support the top surface while under vacuum. The body can optionally contain a separate compartment for storing fresh water used in cleaning and re-supplying the portable toilet.

DESCRIPTION OF THE PRIOR ART

Portable chemical toilets are well known. These devices are capable of being set up and maintained in a variety of outdoor locations, including highway rest areas, athletic fields, concert arenas, construction sites and the like. Transportation is frequently achieved by flatbed trucks, which may include hydraulic or electrical lifts to move the toilets between locations.

Portable toilets require routine maintenance to remove waste material, clean the internal components and add fresh water and toilet articles. A separate truck is used to maintain and replenish the portable toilet. These trucks are generally self-contained with storage tanks and vacuum/pump systems attached. They typically have separate storage containers for waste and fresh water and these containers range in size to match the service area requirement.

SUMMARY OF THE INVENTION

The present invention provides a payload transporter that both transports and removes waste from portable toilets. The instant invention is a flatbed mounted on a truck for the transport of payloads including portable toilets combined with a compartment for wastes and, optionally, a separate compartment for fresh water. The truck bottom has a keel-shaped design to allow solids to gather to the middle for ease of draining. Special baffles are placed within the compartments to prevent liquid surge during transport and to provide structural support for both the top of the bed when transporting toilets and while the bed is under vacuum. When the entire truck bed is used for waste storage, fresh water tank(s) can be optionally attached to the side frame of the truck, as can storage boxes for dry goods.

DETAILED DESCRIPTION OF THE INVENTION

The instant invention is a truck body designed to both transport and maintain portable toilets. It can be self-contained by being mounted to the frame of a truck using standard mounting brackets. The body contains a flat upper or top surface with means to secure the various portable toilets on board and a boat-shaped lower or bottom surface with compartments for storage of wastes and fresh water. The body is also provided with standards for use with side racks, or optionally, for an enclosure over the entire bed.

The invention is best described using the attached figures. These figures are not meant to limit the embodiments of the invention, but are provided for descriptive purposes.

Figure 1:
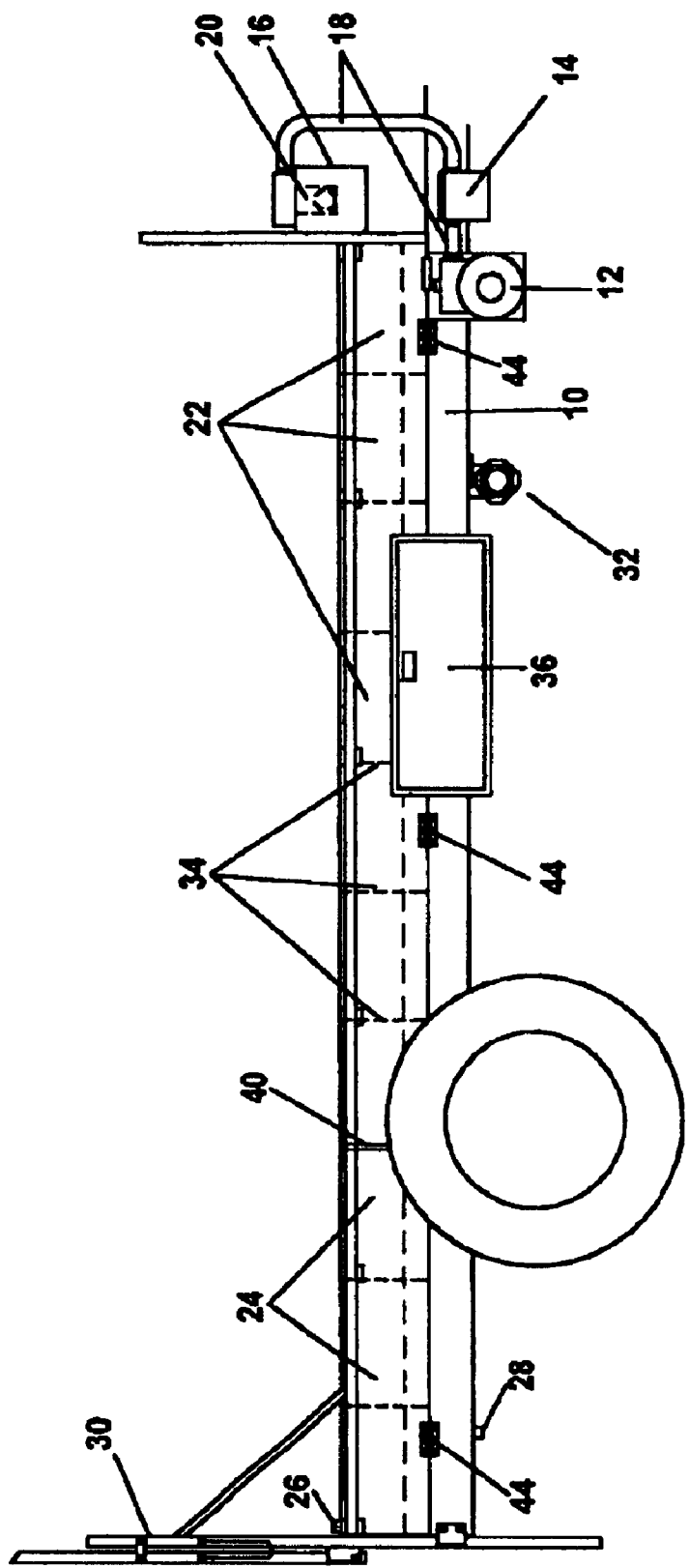
FIG. 1 is a cutaway right side view of the truck bed.

FIG. 1 shows a cutaway right side view of the body mounted to a truck frame 10 using standard mounting brackets. The truck frame 10 serves as the basis for the invention. Attached to the truck frame 10 is a vacuum pump 12 with accompanying moisture trap 14 and high liquid cutoff valve 16. The vacuum pump 12 is preferably powered by the truck engine or by a truck PTO. A non-collapsing hose 18 is hooked from the pump 12 to the moisture trap 14 and then to the front of the tank to the high liquid cutoff valve 16. The cutoff valve 16 provides protection for the pump 12 when liquid levels become too high by preventing said liquids from fouling the components of the pump 12. The cutoff valve 16 is made automatic when a ball float inside floats too high by excess liquids and is sucked onto the vacuum port 20, blocking the vacuum port 20 and preventing liquids from entering the vacuum pump. A hose made of a flexible and non-collapsing material is commonly used to remove wastes from a portable toilet. Using common techniques, a suction hose is hooked to the tank at the first end and contains a ball valve and a solid pipe at the second end. The second end of the suction hose is inserted into the holding tank of a portable toilet. With vacuum applied and by opening the ball valve on the suction hose, the waste material is then pulled through the suction hose and into the holding tank 22 of the truck body. Once the toilet is emptied, it can be cleaned and replenished with fresh water from the fresh water reservoir 24 by means of a twelve Volt DC pump. The fresh water reservoir 24 in this embodiment is contained within the truck body. The fresh water reservoir 24 is serviced by a fill port 26 and water is drawn out by connecting to a separate port 28 in the bottom of the truck body. Alternatively, the emptied toilet can be loaded onto the truck bed for transport using a hydraulic or electric lift 30 attached to the body. In a preferred configuration, this lift 30 is attached at the rear of the truck body.

The waste tank is emptied at an appropriate site by means of a drain valve 32. Because of the keel-shaped design of the bottom of the truck body, solid wastes will gather into the bottom center of the waste tank 22 and then drain from the drain valve 32 using a hose. Special baffles 34 are placed in the waste tank 22 and internal fresh water tank 24 to provide support for payloads and to prevent said tanks from collapsing under vacuum or from the weight of payloads. The baffles 34 are provided with a plurality of openings to prevent liquid surge from occurring while the vehicle is in motion, but at the same time will allow solids to properly drain when needed.

A storage box 36 for hoses and dry goods such as toilet paper, tissues and hand towels can be attached to the truck bed to make access easier and provide a useful location for their transport. Finally, mounting brackets 44 between the truck body and the truck frame 10 are shown.

Figure 2:
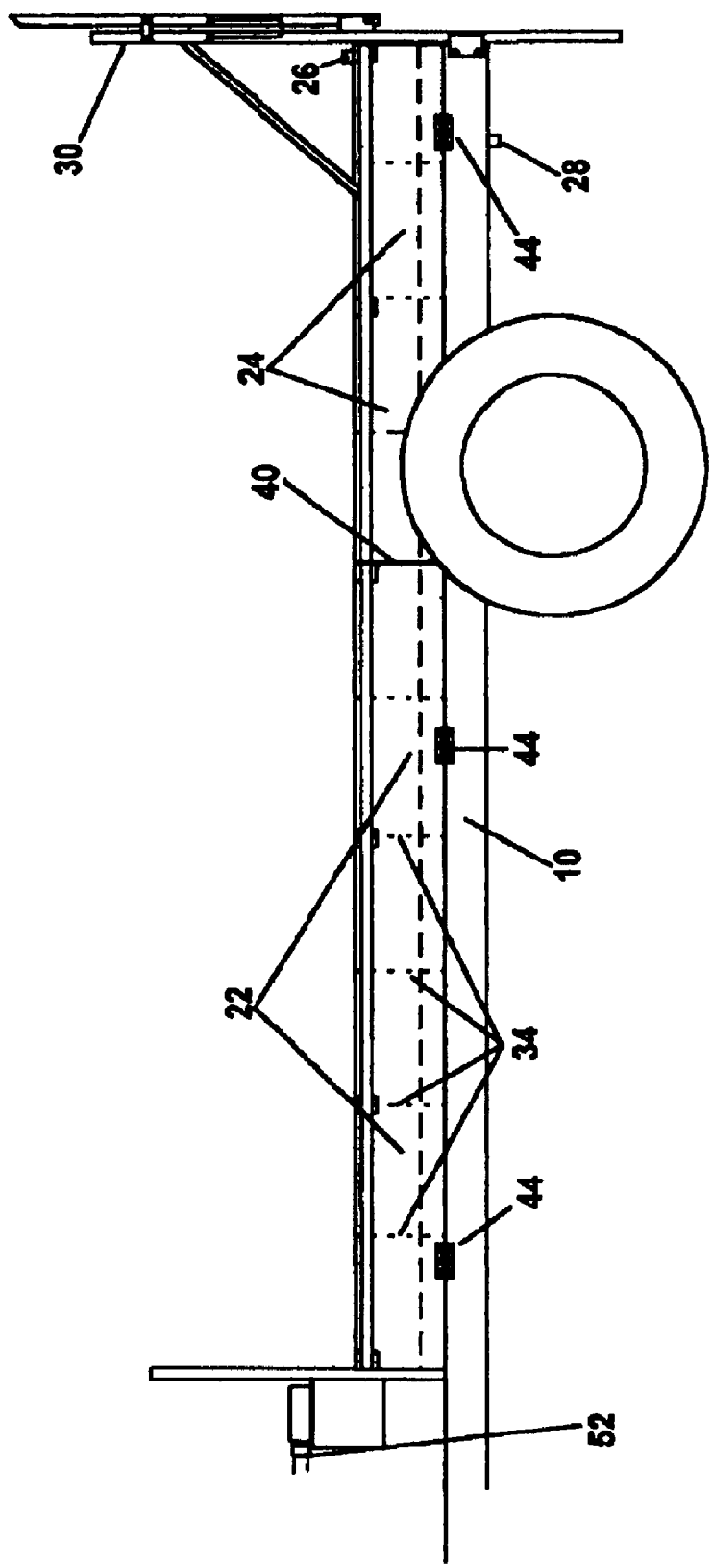
FIG. 2 is a cutaway left side view of the truck bed.

FIG. 2 is a cutaway left side of the trailer. The body contains the quick disconnect coupling 52, the waste tank 22 and the internal fresh water storage tank 24. Baffles 34 are shown to provide the functionality described above. The quick disconnect coupling 52 for the suction hose is visible in this perspective. Using common techniques, this suction hose is hooked to the tank on its first end at the quick disconnect coupling 52 and contains a ball valve and a solid pipe on the second end. The pipe end is inserted into the holding tank of a portable toilet. With vacuum applied, a suction is created throughout waste tank 22 of the body, and by opening the ball valve on the suction hose, the waste material is then pulled through the suction hose and into the holding tank 22 of the truck body. The fresh water fill port 26 and drain port 28 are visible at the rear of the body. Special baffles 34 are placed in the waste tank 22 and internal fresh water tank 24 and a solid divider wall 40 separates the two tanks. The hydraulic or electric lift 30 is shown at the rear of the truck body. The standard mounting brackets 44 are also visible from this side.

Figure 3:
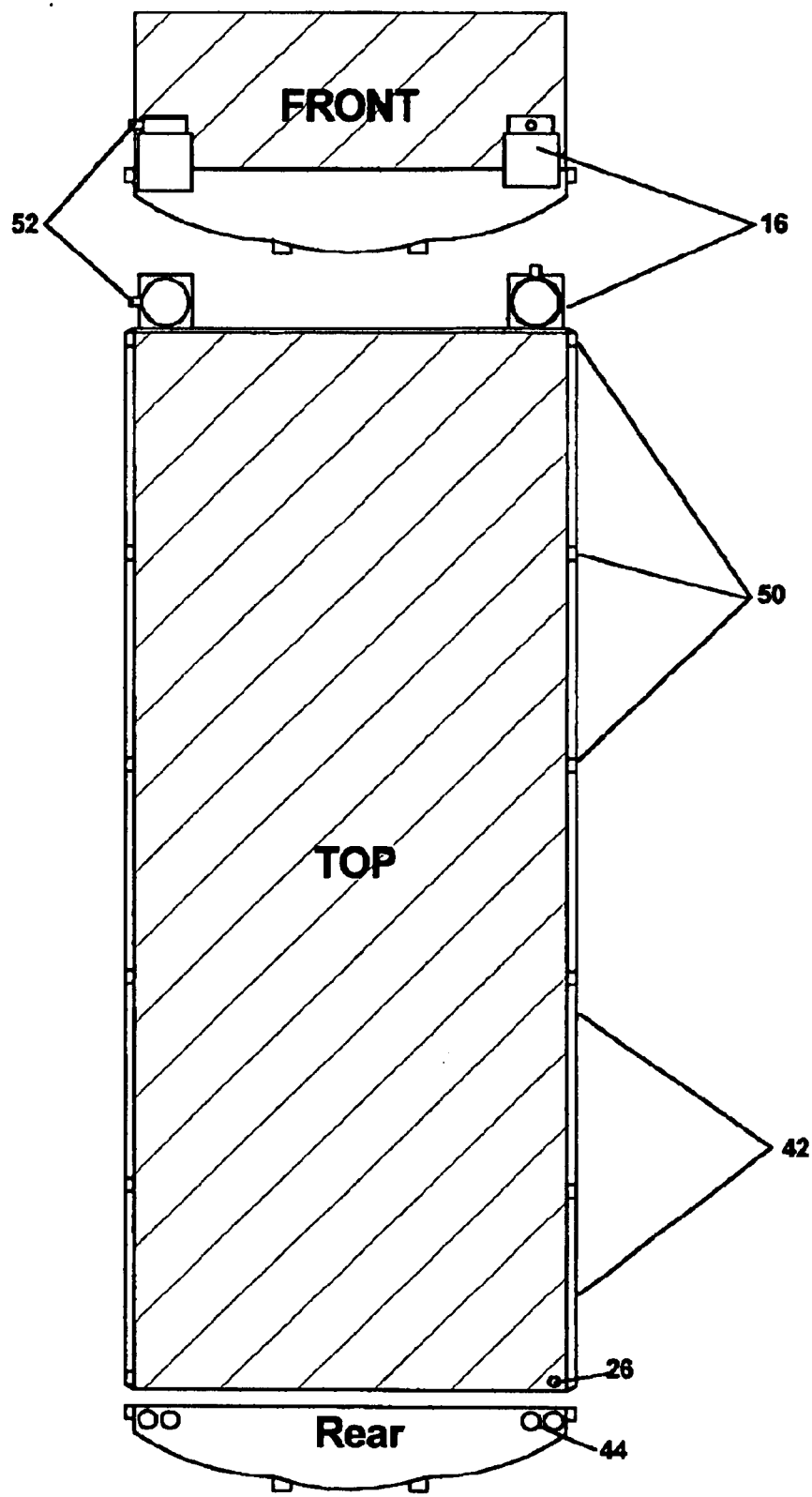
FIG. 3 is a top, rear and front view of the truck bed.

FIG. 3 is a front, top and rear solid view of the truck body. The top surface is a flatbed for transport of portable toilets. The keel-shaped design of the bottom of the body is clearly visible in the front and rear view. A quick disconnect coupling 52 and the automatic shutoff 16 are shown. A plurality of stake pockets 50 and tie down bars 42 are attached to the sides of the body to provide means of attaching racks, totally enclosing the body, or preferably securing portable toilets or other payloads to the body, which have been loaded onto the bed. The water tank fill port 26 is also shown in the top view. In the rear view, taillights, turn signals, and brake lights 44 are shown to demonstrate the typical nature of vehicular safety apparatus on a truck body. The hydraulic or electric lift is not shown in this perspective.

Figure 4:
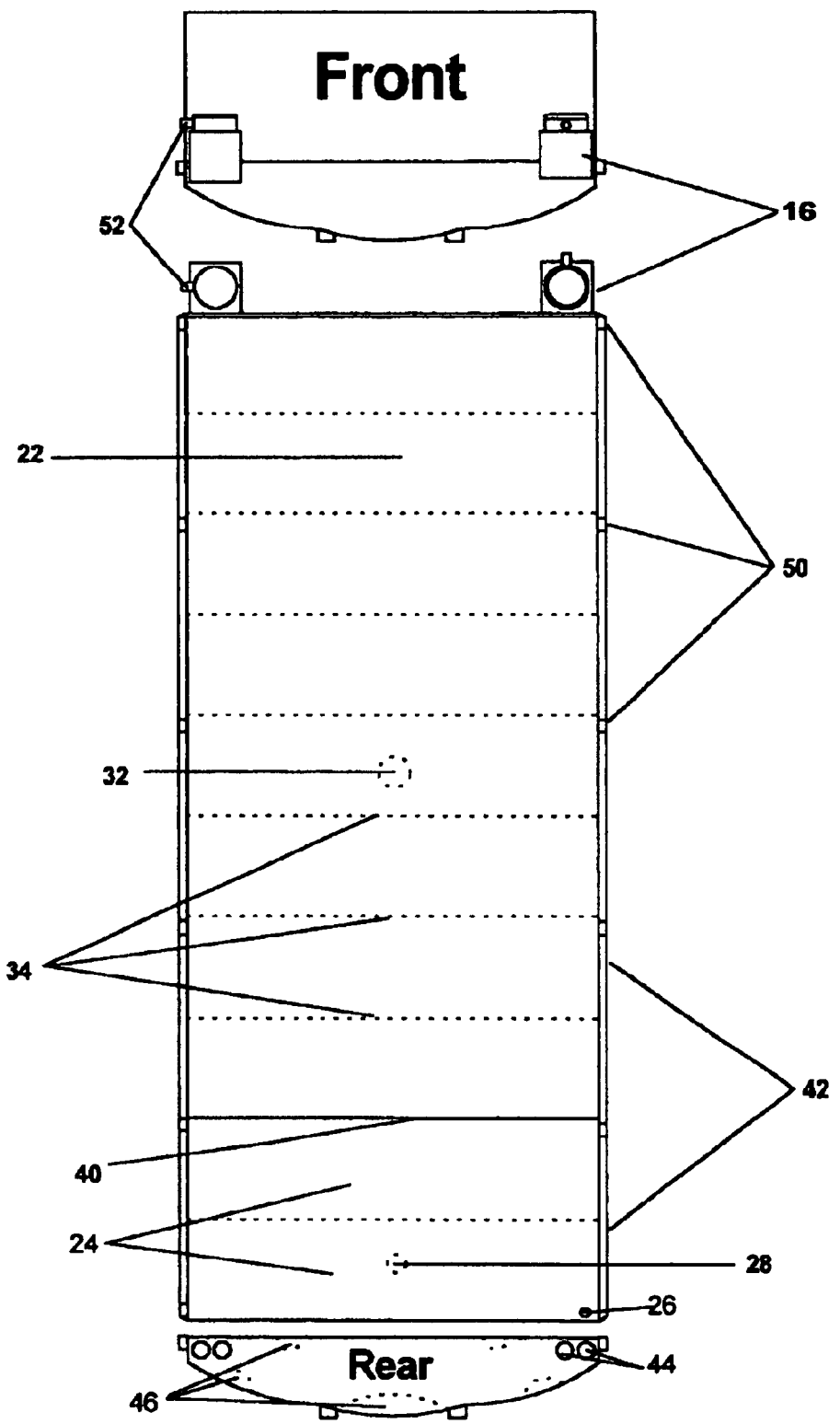
FIG. 4 is a top, rear and front cutaway view of the truck bed.

FIG. 4 is a front, top and rear cutaway view of the body. The keel-shaped design of the bottom of the body is clearly visible in the front and rear views. A quick disconnect coupling 52 for the suction hose and the automatic shutoff 16 are shown. A plurality of stake pockets 50 and tie down bars 42 are attached to the sides of the body to provide means of attaching racks, totally enclosing the body, or preferably securing portable toilets or other payloads to the body after said payloads have been loaded onto the bed. The positioning of the plurality of baffles 34 and the opening of the drain 32 for the waste tank 22 is shown in the cutaway view. Any number of baffles 34 can be placed into the waste tank 22 to provide support. In a preferred embodiment, the baffles 34 are placed twenty-four inches apart. The optional internal fresh water tank 24 is shown at the rear of the body and a solid wall divider 40 is placed to separate the internal fresh water tank 24 from the waste tank 22. The positioning of the fresh water intake 26 and fresh water outlet 28 is shown.

In the rear view, taillights, turn signals, and brake lights 44 are shown to demonstrate the typical nature of vehicular safety apparatus on a truck body. Finally, the baffles 34 are provided with a plurality of openings 46 to prevent liquid surge from occurring while the vehicle is in motion, but at the same time will allow solids to properly drain when needed.

Figure 5:
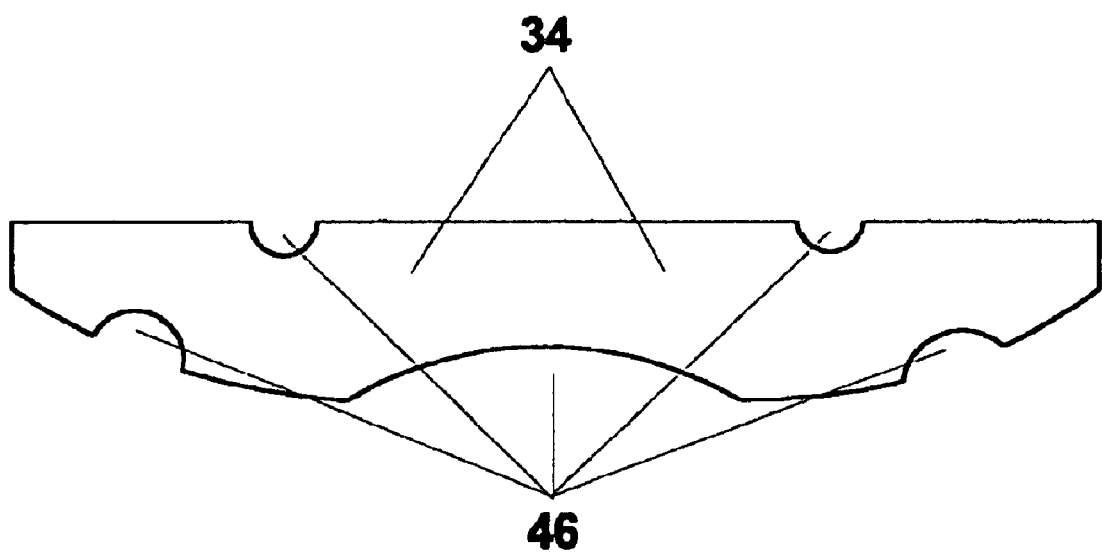
FIG. 5 is a detailed view of the specialized baffles found inside the waste and internal fresh water tanks.

FIG. 5 is a detailed view of the specialized baffles 34 found inside the waste and fresh water tanks. The baffles 34 provide structural support for payloads and prevent the tank from collapsing while under the influence of vacuum. A plurality of openings 46 in the baffles 34 is shown which help to prevent liquid surge while the vehicle is in motion and to aid solids to drain properly.

Figure 6:
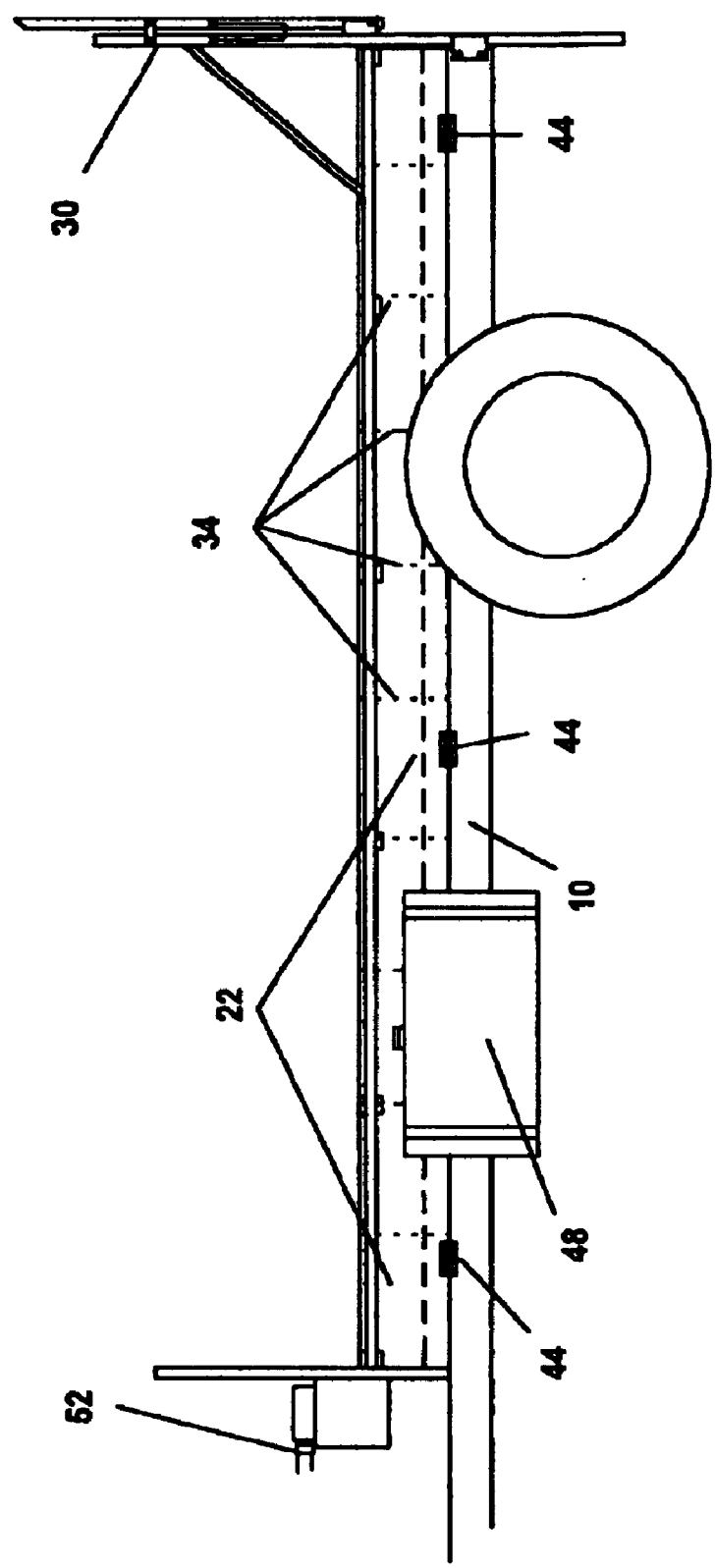
FIG. 6 is a cutaway left side view of the truck bed showing a side mounted water tank.

FIG. 6 is a cutaway left side of the trailer with an external fresh water tank 48 instead of the internal fresh water previously described. The body contains the quick disconnect coupling 52, the waste tank 22 and the external fresh water storage tank 48. In this embodiment, the waste tank 22 now extends over the entire length of the truck body. In another embodiment, both a waste tank and internal fresh water tank can be added in combination with the external fresh water tank. Baffles 34 are shown to provide the functionality described above. The quick disconnect coupling 52 for the suction hose is visible in this perspective. A hose made of a flexible and non-collapsing material is commonly used to remove wastes from a portable toilet. This suction hose is hooked to the tank on the first end at the quick disconnect coupling 52 and contains a ball valve and a solid pipe at the second other end. The pipe end is inserted into the holding tank of a portable toilet. With vacuum applied a suction is created throughout waste tank 22, and by opening the ball valve on the suction hose, the waste material is then pulled through the suction hose and into the holding tank 22 of the truck body. The fresh water fill port and drain ports are integral to the external fresh water tank 48 but where both internal and external fresh water tanks are used, the fill and drain ports are integral to both. Special baffles 34 are placed in the waste tank 22. The hydraulic or electric lift 30 is shown at the rear of the truck body. The standard mounting brackets 44 are also visible from this side.

The preceding examples are provided for descriptive purposes solely and are not meant to limit the embodiments of the invention. Other configurations of the truck will become apparent to those of ordinary skill in the art.

What is claimed is:

1. A payload transporter comprising:
   a truck frame;
   a body, having a front end, rear end, first side, second side, flat upper surface and keel-shaped lower surface, attached to said truck frame;
   at least one waste storage tank under said flat upper surface within said body;
   at least one baffle separating said at least one waste storage tank; and
   a vacuum system mounted on said truck frame and attached to said at least one waste storage tank of said body.

2. The payload transporter of claim 1, wherein the payload comprises a portable toilet.

3. The payload transporter of claim 1, wherein said body is attached to said truck frame by standard mounting brackets.

4. The payload transporter of claim 1, wherein said at least one baffle is a plurality of baffles placed twenty-four inches apart within said body.

5. The payload transporter of claim 1, wherein said at least one baffle contains a plurality of openings.

6. The payload transporter of claim 1, further comprising at least one fresh water storage tank.

7. The payload transporter of claim 6, wherein said at least one fresh water storage tank is located under said flat upper surface within said body.

8. The payload transporter of claim 7, further comprising a wall separating said waste storage tank and said fresh water storage tank.

9. The payload transporter of claim 7, further comprising a fill port on said upper surface of said body above said fresh water storage tank.

10. The payload transporter of claim 7, further comprising an empty port on said bottom surface of said body below said fresh water storage tank.

11. The payload transporter of claim 6, wherein said at least one fresh water storage tank is mounted on the outside of said body.

12. The payload transporter of claim 1, wherein said vacuum system includes:
   a vacuum pump mounted on said truck frame;
   a non-collapsing pump hose connected to said vacuum pump;
   a moisture trap mounted on said truck frame and connected to said vacuum pump by said pump hose;
   a high liquid cutoff valve attached to said body and connected to said moisture trap by said pump hose;
   a suction hose having a first end and a second end, said second end having a ball valve and solid pipe; and
   a quick disconnect coupling attached to said body and connected to said first end of said suction hose.

13. The payload transporter of claim 12, wherein said high liquid cutoff valve includes a ball floated inside the valve that is sucked into a vacuum port when excessive liquids cause the ball to float too high, thereby preventing liquids from entering said vacuum pump.

14. The payload transporter of claim 1, further comprising a lift attached to said body.

15. The payload transporter of claim 14, wherein said lift is a hydraulic lift.

16. The payload transporter of claim 14, wherein said lift is an electric lift.

17. The payload transporter of claim 14, wherein said lift is attached at said rear end of said body.

18. The payload transporter of claim 1, further comprising a drain valve located on the bottom surface of said body below said at least one waste storage tank.

19. The payload transporter of claim 1, further comprising a storage box attached to said truck frame.

20. The payload transporter of claim 1, further comprising a plurality of stake pockets and tie down bars attached to said first and second sides of said body.

21. A method of transporting portable toilets and removing waste from portable toilets using one payload transporter, comprising:
   inserting a suction hose attached to a payload transporter into a holding tank of a portable toilet, said payload transporter comprising:
     a truck frame;
     a body, having a front end, rear end, first side, second side, flat upper surface and keel-shaped lower surface, attached to said truck frame;
     at least one waste storage tank under said flat upper surface within said body;
     at least one baffle separating said at least one waste storage tank; and
     a vacuum system attached to said body;
   pulling waste material from said holding tank through said suction hose using said vacuum system, which deposits said waste material into said at least one waste storage tank;
   loading said portable toilet onto said payload transporter; and
   transporting said portable toilets and said removed waste material to a desired location.

22. The method of claim 21 wherein said payload transporter further comprises at least one fresh water storage tank.

23. The method of claim 22 further comprising using fresh water from said at least one fresh water storage tank to clean or replenish said portable toilets.

24. A payload transporter comprising:
   a truck frame;
   a body, having a front end, rear end, first side, second side, flat upper surface and keel-shaped lower surface, attached to said truck frame;
   at least one waste storage tank under said flat upper surface within said body;
   at least one baffle separating said at least one waste storage tank; and
   a vacuum system mounted on said truck frame and attached to said at least one waste storage tank of said body;
wherein, wherein the payload comprises a portable toilet; and
wherein, wherein said vacuum system includes:
   a vacuum pump mounted on said truck frame;
   a non-collapsing pump hose connected to said vacuum pump;
   a moisture trap mounted on said truck frame and connected to said vacuum pump by said pump hose;
   a high liquid cutoff valve attached to said body and connected to said moisture trap by said pump hose;
   a suction hose having a first end and a second end, said second end having a ball valve and solid pipe; and
   a quick disconnect coupling attached to said body and connected to said first end of said suction hose.

25. The payload transporter of claim 24, further comprising at least one fresh water storage tank.

26. The payload transporter of claim 24, further comprising a lift attached to said body.

* * * * *